US008616960B2

(12) United States Patent
Prendergast et al.

(10) Patent No.: US 8,616,960 B2
(45) Date of Patent: Dec. 31, 2013

(54) METHOD OF GAMING, A GAMING SYSTEM AND A GAME CONTROLLER

(75) Inventors: Kevin Francis Prendergast, East Redfern (AU); Chi We Chim, Castle Hill (AU)

(73) Assignee: Aristocrat Technologies Austrailia Pty Limited (AU)

( * ) Notice: Subject to any disclaimer, the term of this patent is extended or adjusted under 35 U.S.C. 154(b) by 1135 days.

(21) Appl. No.: 12/491,753

(22) Filed: Jun. 25, 2009
(Under 37 CFR 1.47)

(65) Prior Publication Data

US 2010/0160033 A1 Jun. 24, 2010

(30) Foreign Application Priority Data

Jun. 25, 2008 (AU) ................................ 2008903237

(51) Int. Cl.
*A63F 13/00* (2006.01)

(52) U.S. Cl.
USPC .................... 463/25; 463/16; 463/17; 463/20

(58) Field of Classification Search
USPC .......................................... 463/16, 25, 17, 20
See application file for complete search history.

(56) References Cited

U.S. PATENT DOCUMENTS 4,893,816 A 1/1990 Levy
5,411,268 A 5/1995 Nelson
5,613,912 A 3/1997 Slater
5,766,075 A 6/1998 Cook
5,879,007 A 3/1999 Kasri
6,102,400 A * 8/2000 Scott et al. .................... 273/269
6,238,288 B1 * 5/2001 Walker et al. ................... 463/26
6,270,409 B1 8/2001 Shuster
6,488,280 B1 * 12/2002 Katz et al. .................. 273/138.1
6,595,854 B2 * 7/2003 Hughs-Baird et al. .......... 463/20
6,749,198 B2 * 6/2004 Katz et al. .................. 273/138.1
6,811,484 B2 * 11/2004 Katz et al. ....................... 463/17
6,875,106 B2 * 4/2005 Weiss et al. ..................... 463/20
6,913,531 B1 7/2005 Yoseloff
7,052,010 B2 * 5/2006 Katz et al. .................. 273/138.1
7,422,213 B2 * 9/2008 Katz et al. .................. 273/138.1
7,585,222 B2 * 9/2009 Muir .............................. 463/25
7,699,314 B2 * 4/2010 Bozeman .................. 273/138.1
7,798,896 B2 * 9/2010 Katz et al. ....................... 463/20
7,850,522 B2 * 12/2010 Walker et al. ................... 463/25
8,133,105 B2 * 3/2012 Walker et al. ................... 463/16
8,241,100 B2 * 8/2012 Katz et al. ....................... 463/16
8,393,946 B2 * 3/2013 Katz et al. ....................... 463/16
2002/0042297 A1 * 4/2002 Torango .......................... 463/27
2002/0068622 A1 * 6/2002 Kelly et al. ..................... 463/16
2002/0160827 A1 * 10/2002 Slomiany et al. ............... 463/16

(Continued)

FOREIGN PATENT DOCUMENTS

CA 2423555 A1 2/2002
CA 2468279 A1 5/2003

(Continued)

*Primary Examiner* — William H McCulloch, Jr.
(74) *Attorney, Agent, or Firm* — McAndrews, Held & Malloy, Ltd.

(57) ABSTRACT

A gaming system in which a prize value for a current game is determined. A minimum prize value is determined based on a previous game outcome. A provisional prize value is determined based on a current game outcome. An award is made based on a comparison of the minimum prize value and the provisional prize value.

30 Claims, 12 Drawing Sheets

(56) References Cited

U.S. PATENT DOCUMENTS

| | | | | |
|---|---|---|---|---|
| 2002/0177478 | A1 * | 11/2002 | Glasson et al. | 463/19 |
| 2002/0187827 | A1 * | 12/2002 | Blankstein | 463/20 |
| 2003/0060279 | A1 * | 3/2003 | Torango | 463/27 |
| 2003/0064794 | A1 * | 4/2003 | Mead et al. | 463/25 |
| 2003/0220138 | A1 * | 11/2003 | Walker et al. | 463/25 |
| 2005/0032567 | A1 * | 2/2005 | Baerlocher et al. | 463/16 |
| 2005/0054411 | A1 * | 3/2005 | Hughs-Baird et al. | 463/16 |
| 2005/0054430 | A1 | 3/2005 | Pitman | |
| 2005/0101377 | A1 * | 5/2005 | Baerlocher | 463/25 |
| 2006/0025207 | A1 * | 2/2006 | Walker et al. | 463/25 |
| 2006/0040729 | A1 | 2/2006 | Manz | |
| 2006/0073897 | A1 | 4/2006 | Englman | |
| 2006/0160625 | A1 | 7/2006 | Englman | |
| 2006/0183530 | A1 | 8/2006 | Ellis | |
| 2006/0271433 | A1 | 11/2006 | Hughes | |
| 2007/0072667 | A1 | 3/2007 | Limacher | |
| 2007/0096393 | A1 | 5/2007 | Gale | |
| 2007/0155466 | A1 * | 7/2007 | Baerlocher et al. | 463/16 |
| 2007/0184887 | A1 | 8/2007 | Cannon | |
| 2007/0187895 | A1 | 8/2007 | LaClaire | |
| 2008/0045330 | A1 * | 2/2008 | Chim | 463/25 |
| 2008/0064471 | A1 | 3/2008 | Bozeman | |
| 2008/0090633 | A1 | 4/2008 | Bramble | |
| 2008/0220840 | A1 * | 9/2008 | Katz et al. | 463/16 |
| 2008/0290596 | A1 * | 11/2008 | Bogle | 273/139 |
| 2009/0061992 | A1 * | 3/2009 | Boykin et al. | 463/25 |
| 2009/0131154 | A1 * | 5/2009 | Chim et al. | 463/25 |
| 2009/0170587 | A1 * | 7/2009 | Kananen | 463/17 |
| 2009/0221342 | A1 * | 9/2009 | Katz et al. | 463/17 |
| 2010/0120523 | A1 * | 5/2010 | Chim et al. | 463/26 |
| 2010/0160033 | A1 * | 6/2010 | Prendergast et al. | 463/25 |

FOREIGN PATENT DOCUMENTS

| | | | |
|---|---|---|---|
| CA | 2475164 | A1 | 1/2005 |
| CA | 2559834 | A1 | 2/2008 |
| DE | 3101937 | A1 | 8/1982 |
| DE | 3207868 | A1 | 9/1983 |
| DE | 3230788 | A1 | 2/1984 |
| DE | 3501187 | A1 | 7/1986 |
| DE | 3501188 | A1 | 7/1986 |
| DE | 3628463 | A1 | 3/1988 |
| DE | 3825183 | A1 | 2/1990 |
| DE | 4316693 | A1 | 11/1994 |
| DE | 4401190 | A1 | 7/1995 |
| DE | 10123375 | A1 | 11/2002 |
| EP | 1489568 | A2 | 12/2004 |
| FR | 2562299 | A1 | 10/1985 |
| GB | 1447550 | A | 8/1976 |
| GB | 2222712 | A | 3/1990 |
| GB | 2239185 | A | 6/1991 |
| GB | 2328060 | A | 2/1999 |
| GB | 2387260 | A | 10/2003 |
| GB | 2429319 | A | 2/2007 |
| JP | 11235428 | A | 8/1999 |
| JP | 2002346098 | A | 12/2002 |
| JP | 2003024571 | A | 1/2003 |
| JP | 2004024332 | A | 1/2004 |
| JP | 2004154552 | A | 6/2004 |
| JP | 2005192923 | A | 7/2005 |
| JP | 2005270226 | A | 10/2005 |
| JP | 2007050047 | A | 3/2007 |
| JP | 2007252515 | A | 10/2007 |
| JP | 2007252519 | A | 10/2007 |
| JP | 2007252521 | A | 10/2007 |
| JP | 2007252523 | A | 10/2007 |
| JP | 2007252530 | A | 10/2007 |
| JP | 2007301223 | A | 11/2007 |
| JP | 2007312973 | A | 12/2007 |
| KR | 20020059086 | A | 7/2002 |
| WO | 9906969 | A1 | 2/1999 |
| WO | 2005029422 | A1 | 3/2005 |
| WO | 2005075039 | A1 | 8/2005 |
| WO | 2005105243 | A2 | 11/2005 |
| WO | 2008026950 | A2 | 3/2008 |

* cited by examiner

910

| TOTAL | OUTCOME | PROVISIONAL | MINIMUM |
|---|---|---|---|
| 0 (928) | 500 (926) | 500 (924) | 0 (920) |

Free games remaining = 2

| | | | | |
|---|---|---|---|---|
| X | Z | Y | X | Z |
| Pic5 | Pic5 | Pic5 | Pic5 | Pic5 |
| Y | X | Z | S | Y |

Figure 9a

912

| TOTAL | OUTCOME | PROVISIONAL | MINIMUM |
|---|---|---|---|
| 500 (938) | 600 (936) | 1100 (934) | 1000 (930) |

Free games remaining = 1

| | | | | |
|---|---|---|---|---|
| X | Z | Y | X | Z |
| Pic4 | Pic4 | Pic4 | Pic4 | Pic4 |
| Y | X | Z | S | Y |

Figure 9b

914

| TOTAL | OUTCOME | PROVISIONAL | MINIMUM |
|---|---|---|---|
| 1100 (948) | 50 (946) | 1150 (944) | 2200 (940) |

Free games remaining = 0

| | | | | |
|---|---|---|---|---|
| X | Z | Y | X | Z |
| 2 | K | Scatter | J | Scatter |
| Y | X | Z | S | Y |

GAME TOTAL = 2200

Figure 9c

| TOTAL | PROVISIONAL | MINIMUM |
|---|---|---|
| 0 | 500 | 0 |

1020 1010

Free games remaining = 2

| | | | | |
|---|---|---|---|---|
| X | Z | Y | X | Z |
| Pic5 | Pic5 | Pic5 | Pic5 | Pic5 |
| Y | X | Z | S | Y |

Figure 10a

| TOTAL | PROVISIONAL | MINIMUM |
|---|---|---|
| 500 | 600 | 1000 |

1030 1012

Free games remaining = 1

| | | | | |
|---|---|---|---|---|
| X | Z | Y | X | Z |
| Pic4 | Pic4 | Pic4 | Pic4 | Pic4 |
| Y | X | Z | S | Y |

Figure 10b

| TOTAL | PROVISIONAL | MINIMUM |
|---|---|---|
| 1500 | 50 | 2000 |

1040 1014

Free games remaining = 0

| | | | | |
|---|---|---|---|---|
| X | Z | Y | X | Z |
| 2 | K | Scatter | J | Scatter |
| Y | X | Z | S | Y |

GAME TOTAL = 3500

Figure 10c

| TOTAL | OUTCOME | PROVISIONAL | MINIMUM |
|---|---|---|---|
| 0 | 500 | 500 | 0 |
| 1128 | 1126 | 1124 | 1120 |

1110

Free games remaining = 2

| | | | | |
|---|---|---|---|---|
| X | Z | Y | X | Z |
| Pic5 | Pic5 | Pic5 | Pic5 | Pic5 |
| Y | X | Z | S | Y |

Figure 11a

| TOTAL | OUTCOME | PROVISIONAL | MINIMUM (x2) |
|---|---|---|---|
| 500 | 600 | 1100 | 1000 |
| 1138 | 1136 | 1134 | 1130 |

1112

Free games remaining = 1

| | | | | |
|---|---|---|---|---|
| X | Z | Y | X | Z |
| Pic4 | Pic4 | Pic4 | Pic4 | Pic4 |
| Y | X | Z | S | Y |

Figure 11b

| TOTAL | OUTCOME | PROVISIONAL | MINIMUM (+500) |
|---|---|---|---|
| 1100 | 50 | 1150 | 1600 |
| 1148 | 1146 | 1144 | 1140 |

1114

Free games remaining = 0

| | | | | |
|---|---|---|---|---|
| X | Z | Y | X | Z |
| 2 | K | Scatter | J | Scatter |
| Y | X | Z | S | Y |

GAME TOTAL = 1600

Figure 11c

1210

TOTAL PROVISIONAL MINIMUM 300 500 600 1220

Free games remaining = 2

| | | | | |
|---|---|---|---|---|
| X | Z | Y | X | Z |
| Pic5 | Pic5 | Pic5 | Pic5 | Pic5 |
| Y | X | Z | S | Y |

Figure 12a

1212

TOTAL PROVISIONAL MINIMUM 600 600 1200 1230

Free games remaining = 1

| | | | | |
|---|---|---|---|---|
| X | Z | Y | X | Z |
| Pic4 | Pic4 | Pic4 | Pic4 | Pic4 |
| Y | X | Z | S | Y |

Figure 12b

1214

TOTAL PROVISIONAL MINIMUM 1800 50 3600 1240

Free games remaining = 0

| | | | | |
|---|---|---|---|---|
| X | Z | Y | X | Z |
| 2 | K | Scatter | J | Scatter |
| Y | X | Z | S | Y |

GAME TOTAL = 5400

Figure 12c

| TOTAL | OUTCOME | PROVISIONAL | MINIMUM |
|---|---|---|---|
| 0 (1328) | 0 (1326) | 0 (1324) | 0 (1320) |

1310

Free games remaining = 2

| | | | | |
|---|---|---|---|---|
| X | Z | Y | X | Z |
| S | Y | X | Z | S |
| Y | X | Z | S | Y |

Figure 13a

| TOTAL | OUTCOME | PROVISIONAL | MINIMUM |
|---|---|---|---|
| 0 (1338) | 0 (1336) | 0 (1334) | 20 (1330) |

1312

Free games remaining = 1

| | | | | |
|---|---|---|---|---|
| X | Z | Y | X | Z |
| Z | Y | X | Z | S |
| Y | X | Z | S | Y |

Figure 13b

| TOTAL | OUTCOME | PROVISIONAL | MINIMUM |
|---|---|---|---|
| 20 (1348) | 50 (1346) | 70 (1344) | 40 (1340) |

1314

Free games remaining = 0

| | | | | |
|---|---|---|---|---|
| X | Z | Y | X | Z |
| Z | Scatter | S | scatter | X |
| Y | X | Z | S | Y |

Figure 13c

| TOTAL | OUTCOME | PROVISIONAL | MINIMUM |
|---|---|---|---|
| 70 (1358) | 50 (1356) | 120 (1354) | 140 (1350) |

1316

Free games remaining = 0

| | | | | |
|---|---|---|---|---|
| Scatter | Z | Y | X | Z |
| Z | Y | S | scatter | X |
| Y | X | Z | S | Y |

GAME TOTAL = 140

Figure 13d

METHOD OF GAMING, A GAMING SYSTEM AND A GAME CONTROLLER

RELATED APPLICATIONS

This application claims priority to Australian Provisional Patent Application No. 2008903237 having a filing date of Jun. 25, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a method of gaming, a gaming system and a game controller.

It is known to provide a gaming system including a gaming controller arranged to generate a random result and apply game rules to the result to determine a game outcome for which a player may be awarded a prize if a predetermined winning outcome occurs. A player can place a wager to play the game and typically the wagered amount will represent a number of credits or a monetary value. A prize awarded to a player based on a winning outcome can be based on the amount wagered to play the game.

There is a need for an alternative game in order to maintain or increase player interest and enjoyment.

BRIEF SUMMARY OF THE INVENTION

According to one aspect there is provided a method of gaming comprising:

(a) determining a minimum prize value to be awarded for a current game outcome based on a previous game outcome;

(b) generating the current game outcome;

(c) determining a provisional prize value based on the current game outcome;

(d) comparing the provisional prize value with the minimum prize value; and (e) setting a current prize value at the minimum prize value upon the provisional prize value being less than the minimum prize value or at the provisional prize value upon the provisional prize value being greater than or equal to the minimum prize value.

In an embodiment, the minimum prize value is determined based on a previous prize value determined for the previous game outcome.

In an embodiment, the minimum prize value is determined by multiplying the previous prize value by a given multiplier.

In an embodiment, the multiplier is predetermined.

In an embodiment, the multiplier is determined during game play based on at least one game rule.

In an embodiment, the multiplier is determined based on player action.

In an embodiment, the method further comprises:

updating the previous prize value based on the current prize value; and repeating steps (a) to (e) to generate a subsequent prize value with the updated previous prize value.

In an embodiment the method comprises determining the provisional prize value by determining a current game outcome prize value and adding the current game outcome prize value to the previous prize value.

In an embodiment, steps (a) to (e) are provided in a feature game.

In an embodiment, access to the feature game is provided on fulfillment of eligibility criteria.

In an embodiment, the eligibility criteria is based on at least one of a game outcome and player activity.

In an embodiment, the method comprises generating an initial game outcome, determining an initial prize value and determining an initial minimum prize value from the initial prize value.

In an embodiment, steps (a) to (e) are repeated until an end condition is met and the current prize value is awarded when the end condition is met.

In an embodiment, the end condition is a given number of repetitions.

In an embodiment, the end condition is a given game outcome occurring.

According to another aspect there is provided a game controller for a gaming system, the game controller arranged to:

determine a minimum prize value to be awarded for a current game outcome based on a previous game outcome;

generate the current game outcome;

determine a provisional prize value based on the current game outcome;

compare the provisional prize value with the minimum prize value; and set a current prize value at the minimum prize value upon the provisional prize value being less than the minimum prize value or at the provisional prize value upon the provisional prize value being greater than or equal to the minimum prize value.

In an embodiment, the game controller is arranged to determine the minimum prize value based on a previous prize value determined for the previous game outcome.

In an embodiment, the minimum prize value is determined by multiplying the previous prize value by a given multiplier.

In an embodiment, the multiplier is predetermined.

In an embodiment, the multiplier is determined during game play based on at least one game rule.

In an embodiment, the multiplier is determined based on player action.

In an embodiment, the game controller is further arranged to update the previous prize value based on the current prize value and conduct a subsequent iteration with the updated previous value to determine a new current prize value.

In an embodiment, the game controller is arranged to determine the provisional prize value by determining a current game outcome prize value and adding the current game outcome prize value to the previous prize value.

In an embodiment, the game controller is arranged to generate an initial game outcome, determine an initial prize value and determine an initial minimum prize value from the initial prize value.

In an embodiment, the game controller is arranged to repeatedly generate game outcomes until an end condition is met and to award the current prize value when the end condition is met.

According to another aspect there is provided a game system comprising:

a player interface for entering game play instructions by a player and providing game outcome and prize information to the player;

a game outcome generator adapted to generate a game outcome for a player based on a random result and determine a provisional prize value based on any winning criteria occurring in the game outcome; and a prize manager adapted to determine a minimum prize value for a current game outcome based on a previous game outcome, compare the provisional prize value with the minimum prize value, and set a current prize value at the minimum prize value upon the provisional prize value being less than the minimum prize value or at the provisional prize value upon the provisional prize value being greater than or equal to the minimum prize value.

In an embodiment, the game system is arranged to determine the minimum prize value based on a previous prize value determined for the previous game outcome.

In an embodiment, the game controller is the minimum prize value is determined by multiplying the previous prize value by a given multiplier.

In an embodiment, the game controller is the prize manager is further arranged to update the previous prize value based on the current prize value and the game outcome generator and prize manager of the gaming system conduct a subsequent iteration with the updated previous value to determine a new current prize value.

In an embodiment, the game controller is the game outcome generator is arranged to determine the provisional prize value by determining a current game outcome prize value and adding the current game outcome prize value to the previous prize value.

In an embodiment, the game system is arranged to generate an initial game outcome, determine an initial prize value and determine an initial minimum prize value from the initial prize value.

In an embodiment, the game system is arranged to repeatedly generate game outcomes until an end condition is met and to award the current prize value when the end condition is met.

According to another aspect there is provided a game system comprising:

means for determining a minimum prize value to be awarded for a current game outcome based on a previous game outcome;

means for generating the current game outcome;

means for determining a provisional prize value based on the current game outcome;

means for comparing the provisional prize value with the minimum prize value; and means for setting a current prize value at the minimum prize value upon the provisional prize value being less than the minimum prize value or at the provisional prize value upon the provisional prize value being greater than or equal to the minimum prize value.

According to another aspect there is provided a gaming system comprising:

a cabinet;

a display mounted to the cabinet for displaying game outcomes to a player;

at least one input device mounted to the cabinet and operable by a player to initiate plays of a game; and a game controller disposed within the cabinet, the game controller comprising a memory storing program code and a processor in data communication with the display, the input device and the memory and arranged to execute at least part of the program code in response to initiation of a play of the game to implement a game, such that during some instances of the game, the game controller determines a minimum prize value to be awarded for a current game outcome based on a previous game outcome, generates the current game outcome, determines a provisional prize value based on the current game outcome, compares the provisional prize value with the minimum prize value, and sets a current prize value at the minimum prize value upon the provisional prize value being less than the minimum prize value or at the provisional prize value upon the provisional prize value being greater than or equal to the minimum prize value.

According to another aspect there is provided computer program code which when executed implements the above method.

According to another aspect there is provided a tangible computer readable medium comprising the computer program code.

BRIEF DESCRIPTION OF SEVERAL VIEWS OF THE DRAWINGS

Exemplary embodiments of the invention will now be described in relation to the following drawings in which:

FIGS. 9*a* to 9*c* illustrate reel spin outcomes for Example 1.

FIGS. 10*a* to 10*c* illustrate reel spin outcomes for Example 2.

FIGS. 11*a* to 11*c* illustrate reel spin outcomes for Example 3.

FIGS. 12*a* to 12*c* illustrate reel spin outcomes for Example 4.

FIGS. 13*a* to 13*d* illustrate reel spin outcomes for Example 5.

DETAILED DESCRIPTION OF THE INVENTION

Embodiments of a gaming method and gaming controller as described are adapted to determine a minimum prize value for a current game outcome based on a previous game outcome and set the prize to be awarded for the current game outcome to the minimum prize value if a provisional prize value determined based on the current game outcome is less than the determined minimum prize value. Embodiments may be applied to any type of game, such as a spinning reel game, poker, keno, bingo, pinball, dice and the like implemented.

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
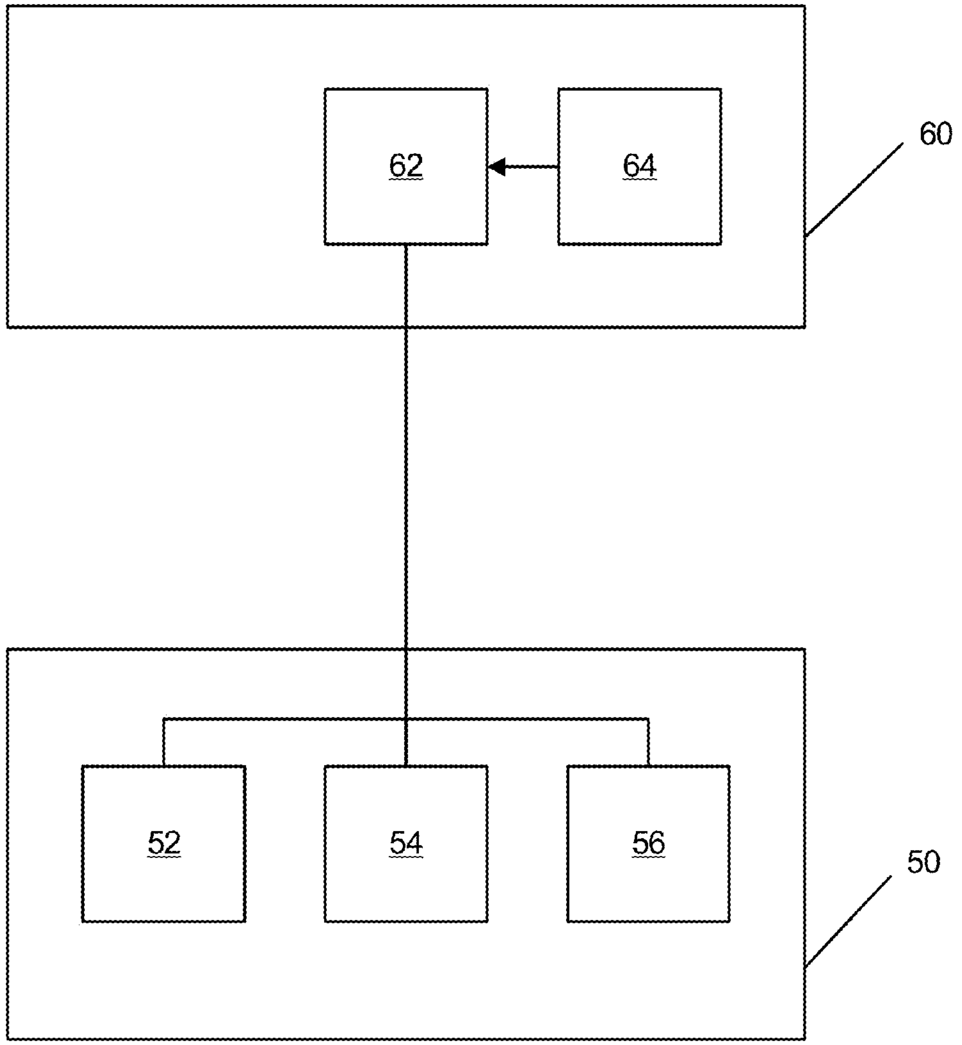
FIG. 1 is a block diagram of the core components of a gaming system.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54 and a game play mechanism 56 comprising one or more input devices that enable a player to input game play instructions.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
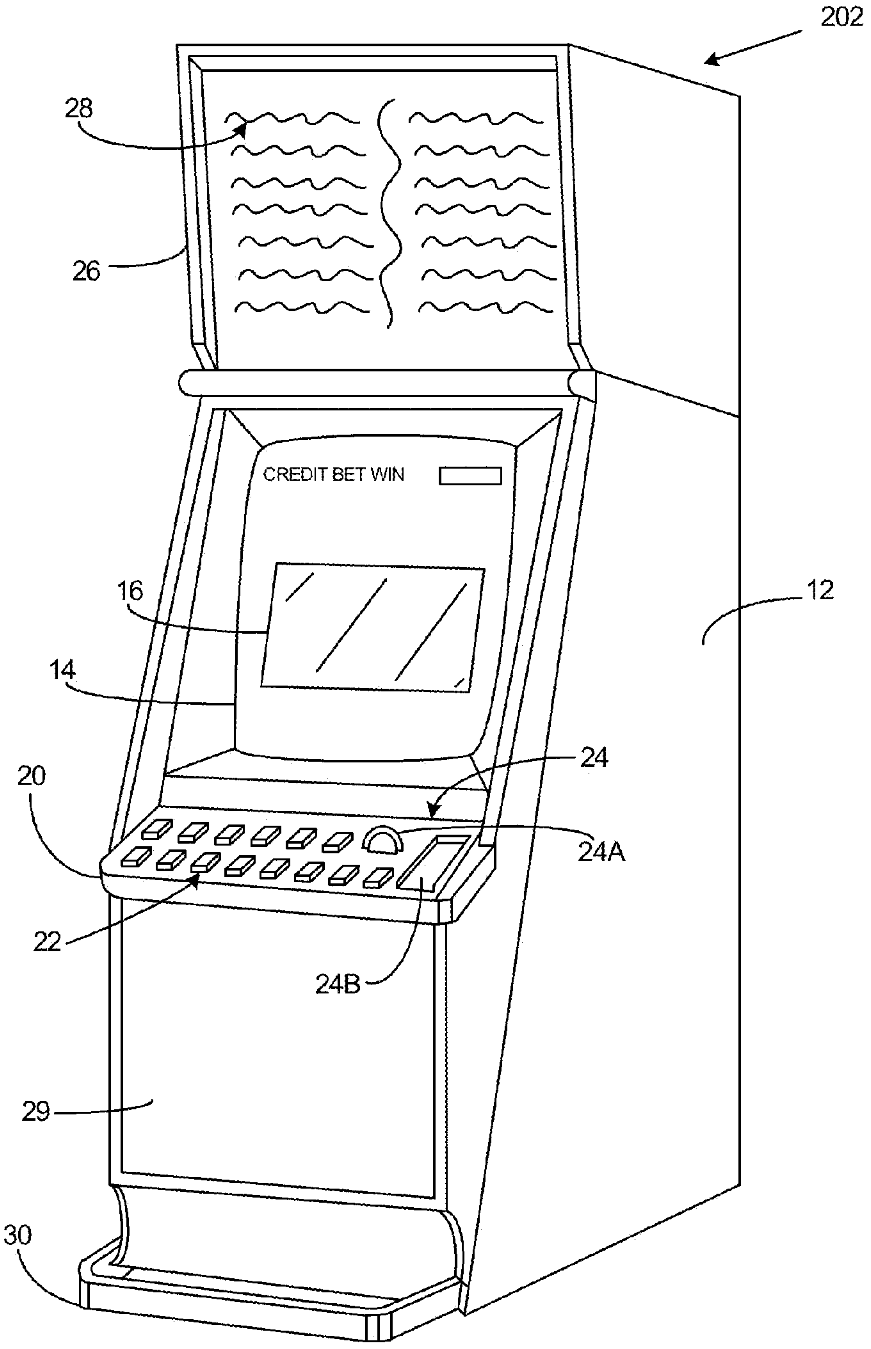
FIG. 2 is a perspective view of a gaming machine.

A gaming system in the form of a stand alone gaming machine 202 is illustrated in FIG. 2. The gaming machine 202 includes a console 12 having a display 14 on which is displayed representations of a game 16 that can be played by a player. A mid-trim 20 of the gaming machine 202 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 202.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
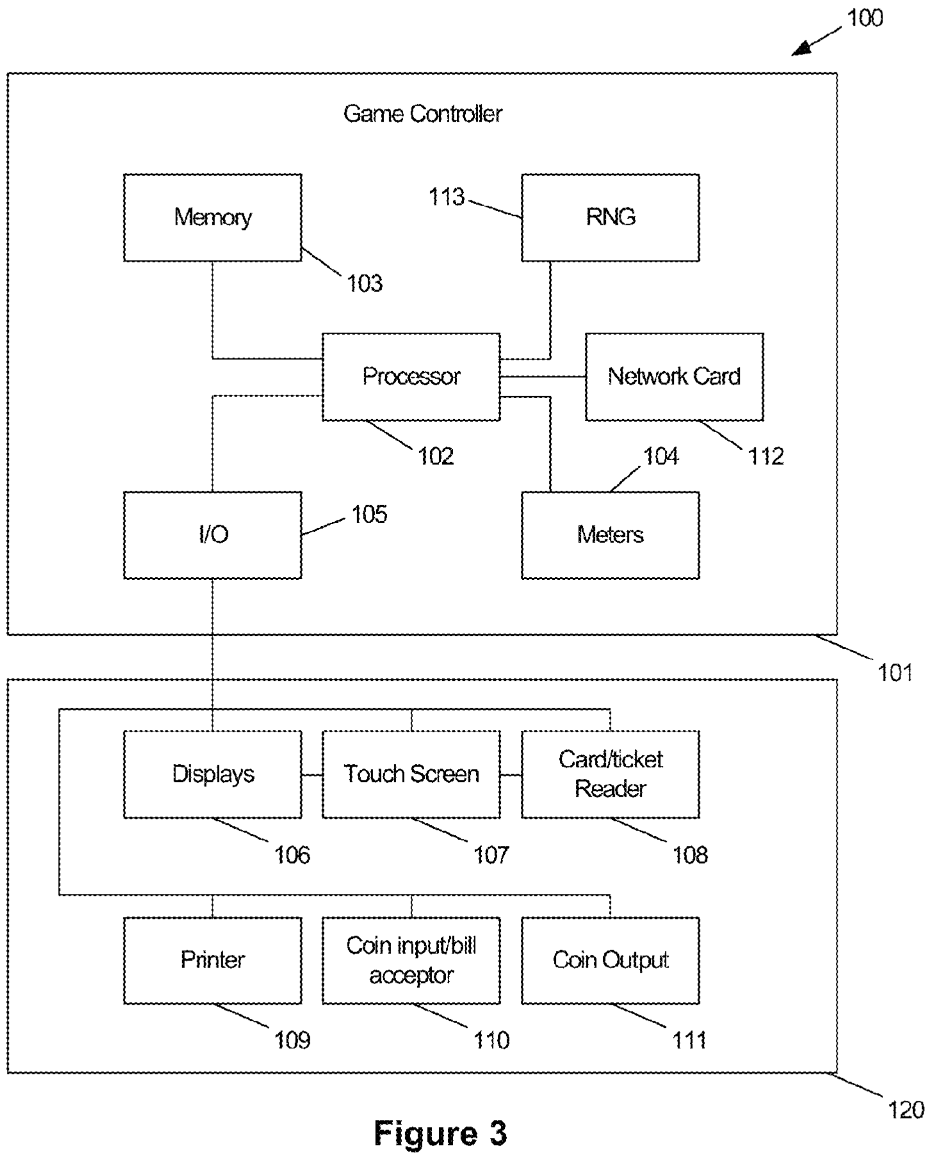
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 comprise one or more displays 106, a touch screen and buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a central controller, server or database and receive data or commands from the central controller, server or database.

Figure 4:
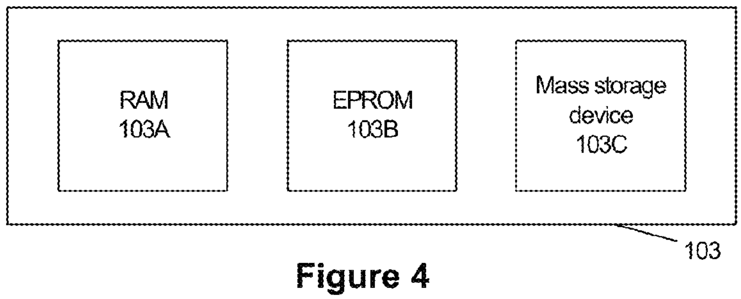
FIG. 4 is a block diagram representing the structure of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
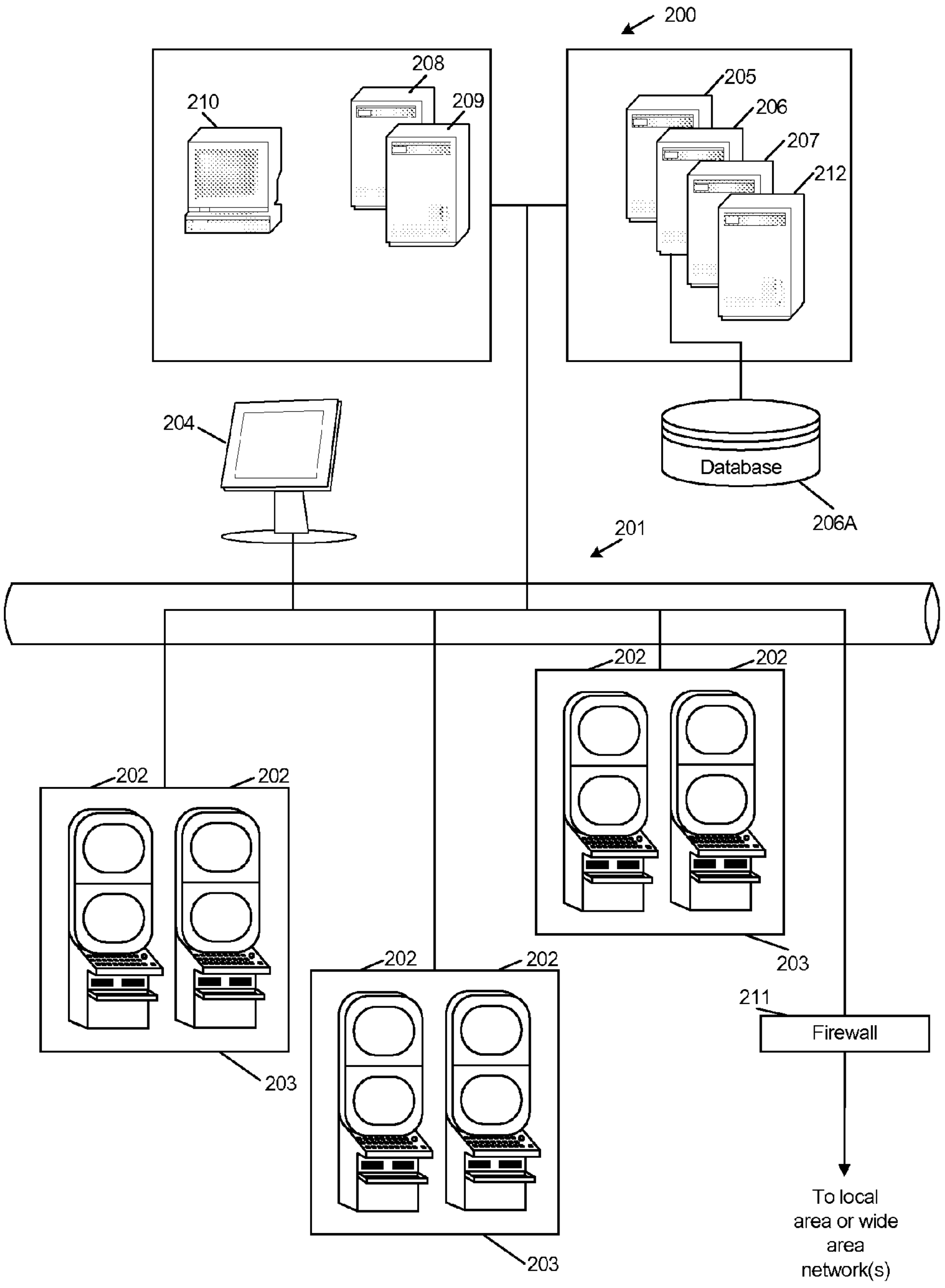
FIG. 5 is a diagram schematic of a networked gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 202, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game. Additional servers 212 may be provided to implement other functions depending on the embodiment implemented for the gaming venue.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

Embodiments of the present invention relate to gaming systems that determine a minimum prize value to be awarded for a game outcome based on a previous prize value and set a prize to be awarded for a game outcome to the minimum prize value if a provisional prize value, determined based on the game outcome, is less than the determined minimum prize value. Embodiments may be applied for any type of game, for example spinning reel, poker, keno, bingo, pin and ball, dice games etc Embodiments may be used in game systems which use mechanical random result generation processes or electronic random number generators to generate game outcomes.

Figure 6:
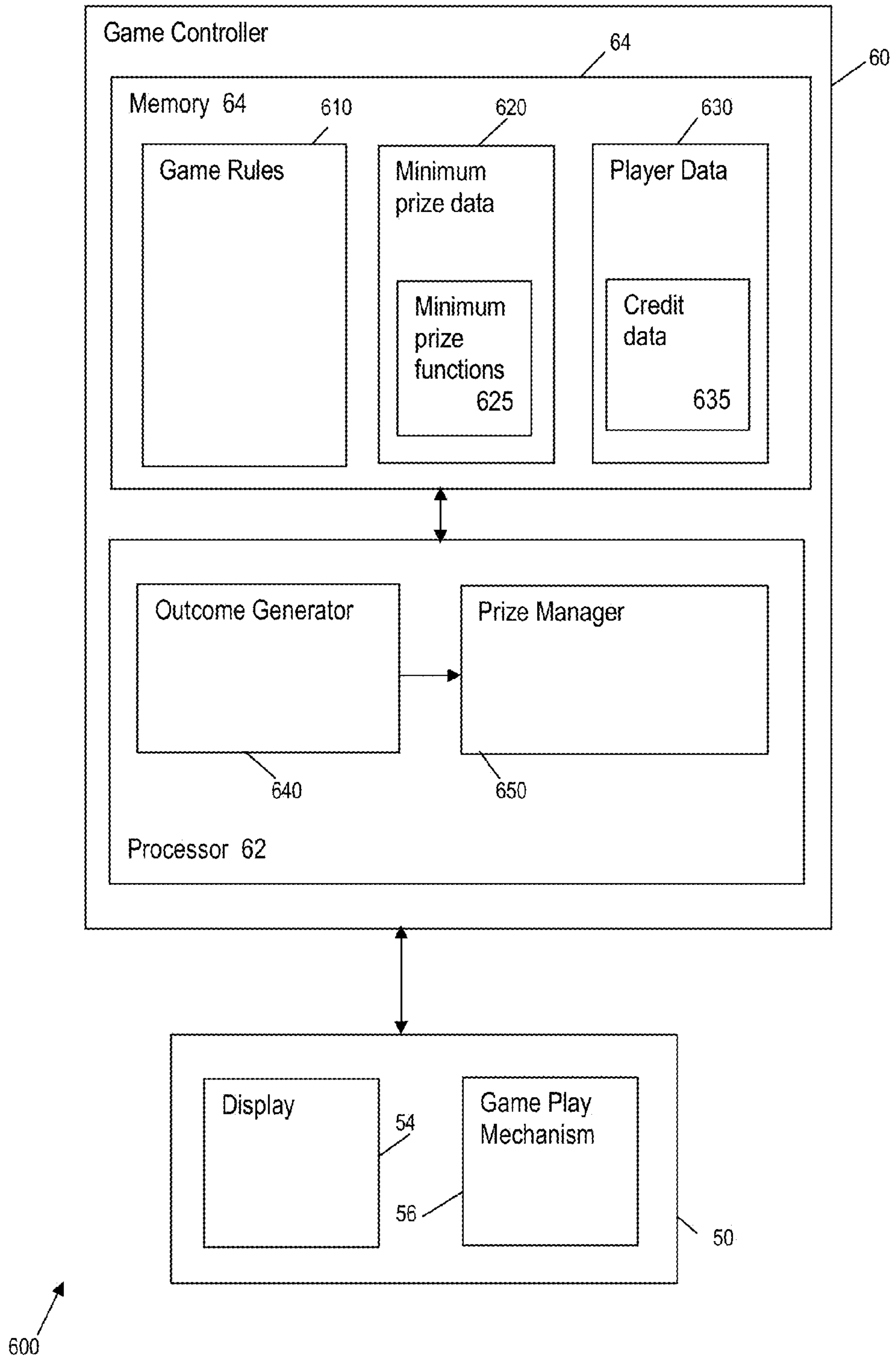
FIG. 6 is a further block diagram of a gaming system.

An embodiment of a game system 600 for providing a game applying a minimum prize value is illustrated in FIG. 6. The system 600 comprises a player interface 50 and a game controller 60 game controller. The player interface includes a display 54 for displaying game data including outcome data and prize data, and a game play mechanism 56 enabling a player to input game play instructions. The game controller 60 includes a processor 62 and a memory 64. In this embodiment memory 64 stores game rules 610, for the game being played, minimum prize data 620 and player data 630. In this embodiment a game outcome generator 640 and a prize manager 650 are implemented as functions in the processor 62.

The game outcome generator 640 can include all the functions required for generating a random result, applying game rules to the random result to generate a game outcome, displaying the game outcome and determining whether a prize is to be awarded to the player for the game outcome based on game rules 610. Alternatively the game outcome generator may receive game result data generated using another module or a mechanical random result generation process and simply be adapted to apply game rules 610 to the generated game result data to determine the game outcome and whether a prize winning event has occurred. The outcome generator may also be adapted to determine a provisional value for prize to be awarded for a winning event, for example based on a wager and the winning outcome. Alternatively a provisional value for the prize to be awarded may be determined by the prize manager 650 based on a game outcome and optionally player data such as the wagered amount for a game. Player data 630 is optional in determining prizes for game outcomes as prizes may be awarded for "free play" games which do not require a wager to be placed.

The prize manager 650 is adapted to determine a minimum prize value for a current game outcome based on a previous game outcome. The prize manager 650 compares a provisional prize value for a prize to be awarded to the player for the current game outcome with the determined minimum prize value, and modifies the prize value to be awarded to the minimum prize value if the provisional prize value is less than the minimum prize value.

The minimum prize value for a current game outcome is determined based on a previous game outcome. For example the minimum prize value may be calculated from a previous prize value, for example doubling a previously awarded prize value. Alternatively where a previous game outcome met no prize wining criteria, the minimum prize value may be determined based on a game rule, for example set to a given credit value such as ten credits. In one embodiment, a series of game outcomes are calculated as a series of free spins and a minimum prize value is set by the first prize which is awarded, whether this be in the first game outcome, the second game outcome etc. (Put another way, the minimum prize is zero until an award is made). The minimum prize value for a current game outcome can be stored in memory 64 as player data 630 along with other game play instructions, including any wager data and win meter credit data 635.

The number of game outcomes for which a minimum prize value can be applied may be defined as a fixed number or based on game outcomes in accordance with game rules 610. For example, a minimum prize value may be applied for a number of "free spins" (also know as free games) in a spinning reel game, where the number of "free spins" is determined based on a predetermined combination appearing in an outcome reel spin of a previous game, such as three cats for three "free spins" or three dogs for four "free spins". In another the number of game outcomes may be randomly selected in accordance with a random result generation process and game rules. Alternatively a minimum prize value may be applied for a series of feature games, initiated when an entry criteria is met, such as a feature game trigger symbol occurring in a base game outcome, and a minimum prize value may be determined and applied for a plurality of successive feature game outcomes until an end condition is met, such as an exit symbol appearing in a feature game outcome or a given number of feature game outcomes being generated.

In some embodiments a mathematical operation used to determine the minimum prize value may also be based on a game outcome. For example, an outcome including a doubler, or two times multiplier, symbol can cause a minimum prize value to be determined by doubling a previous prize value, whereas a three time multiplier symbol may cause a minimum prize value to be determined by tripling a previous prize value.

Alternatively a mathematical operation used to determine the minimum prize value may be randomly selected for a player from a plurality of minimum prize determination functions 625 stored in memory 64. For example, minimum prize determination functions 625 may include multipliers of a number of given values to be applied to a previous prize value, mathematical functions for application to one or more previous values, such as addition of two previous prize values to give the minimum prize value, or combinations thereof. A skilled person should appreciate that any number of mathematical functions may be applied to determine a minimum prize value based on at least one previous prize value.

Credit units or "credits" representing a monetary value are often used for wagers and prizes, the credits can be redeemed as cash or other prizes of equivalent value when a player chooses to stop playing. For example, each credit unit may represent a monetary value of 5 cents, so a player winning 10000 credits may redeem the monetary value of $500 for the 10000 credits from the gaming venue when they have finished playing.

Figure 7:
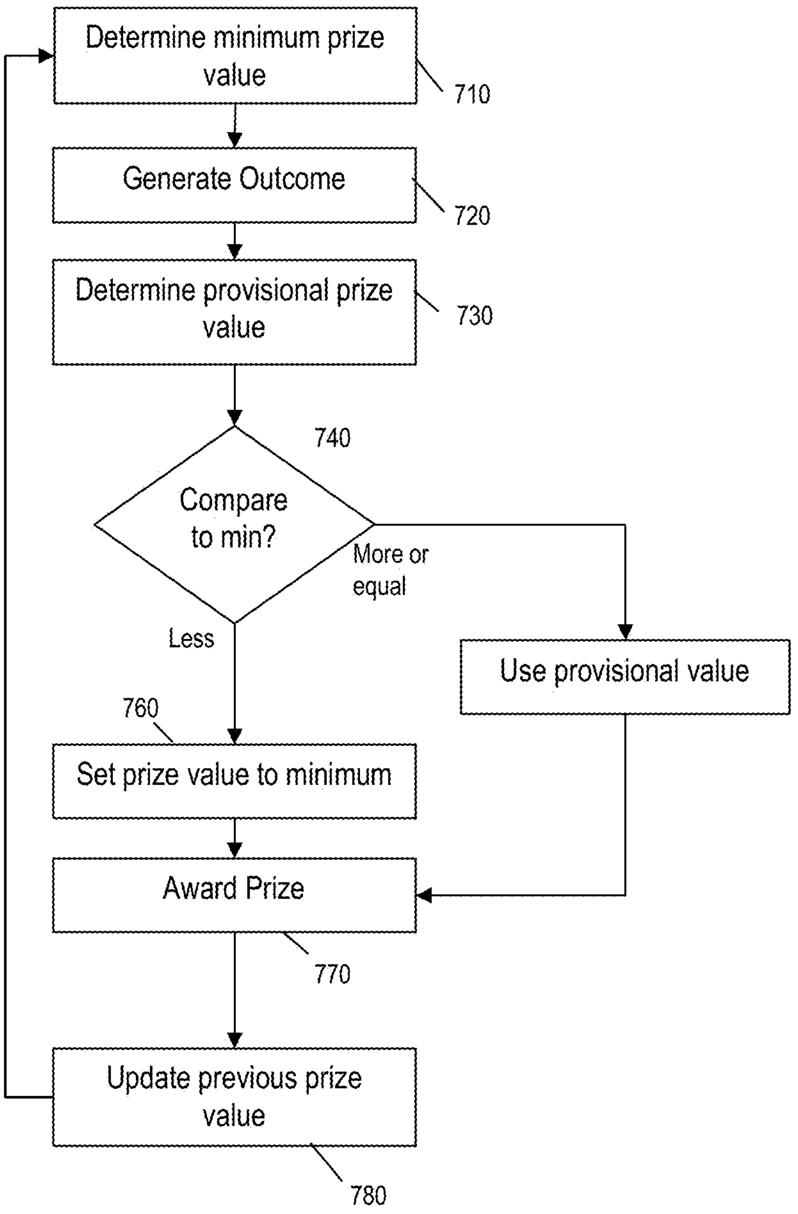
FIG. 7 is a flowchart of an embodiment of a game process.

An embodiment of a game play process where a minimum prize value is applied is illustrated in FIG. 7. In this example wagers and prizes are given as credits and the minimum prize value for a current game outcome is determined by multiplying the number of prize credits for the previous game outcome by two. The embodiment illustrated the minimum prize value is applied for each game outcome, for example this process may be executed for a series of a given number of game outcomes initiated by placing a bet. A minimum prize value 710 for a current game outcome is determined based on a prize value for a previous game outcome. Where this is an initial game and no previous game outcome has occurred the minimum prize value may be set to a given value, for example zero or ten credits. In the case, where the prize is set at zero, the minimum prize value will continue to be zero until an award is made. Where a previous prize value for a previous game outcome exists then the minimum prize value is determined based on the previous prize value. For example where the previous prize value is fifty credits the minimum prize value is determined by doubling this value, thus the minimum prize value is one hundred credits. The determined minimum prize value may also be displayed to the player. A game outcome is generated 720 and displayed to the player. A provisional prize value is determined 730 based on the generated game outcome, for example a provisional prize value of fifty credits for three cherries appearing in a win line of the displayed game outcome. The provisional prize value may be displayed to the player along with the game outcome. The determined provisional prize value is compared with the minimum prize value 740 determined for the outcome. Where the provisional prize value is greater or equal to the minimum prize value, the prize value to be awarded for the outcome will be set to the provisional prize value 750. For example, where the minimum prize value is ten credits and the provisional prize value fifty credits, then the prize to be awarded 770 will be set to fifty credits. However, where the provisional prize value is less than the provisional prize value, the prize value to be awarded is set to the determined minimum prize value 760. For example, where the provisional prize value is fifty credits and the minimum prize value is one hundred credits, then the prize value to be awarded will be set to one hundred credits. The prize is then awarded to the player 770 and the previous prize value updated 780 for subsequent use based on the prize awarded for use when determining the next minimum prize value 710. That is where there are a series of game outcomes, the prize value of a current game outcome is used as the basis for the minimum prize value in a subsequent game round. It will be appreciated that the game round referred to as the subsequent game round will be the current game round when it is conducted.

It should be appreciated by the skilled person that in the above method, the minimum prize value for a current game for this embodiment will be at least double the minimum prize awarded for a previous game. This process can be repeated with the minimum prize value increasing for each current game outcome for the given number of game outcomes. The final value of the current prize value is then awarded to the player.

The gaming system of one embodiment provides "base games" and "feature games" wherein the minimum prize value is applied. For example the feature becomes available once eligibility criteria are met. The eligibility for a feature game may be based on an outcome of a base game, for example the appearance of a special symbol or combination of symbols in a game outcome of a base game. The player may pay an additional bet, known as an "ante bet", for a chance to play a feature game. Alternatively payment of an ante bet alone may fulfill the eligibility criteria to play a feature game applying a minimum prize value. The amount wagered for an ante bet may determine a minimum prize value multiplier value and/or the number of game outcomes for which a minimum prize value may be applied in the feature game.

In one variation during the feature game, a series of game outcomes are generated for which a minimum prize value is applied. Feature game outcomes may be generated until an end condition is met. For example, an end condition may be that a specified number of feature game outcomes have been generated or a feature game outcome including an end condition such as a specified symbol has occurred.

Figure 8:
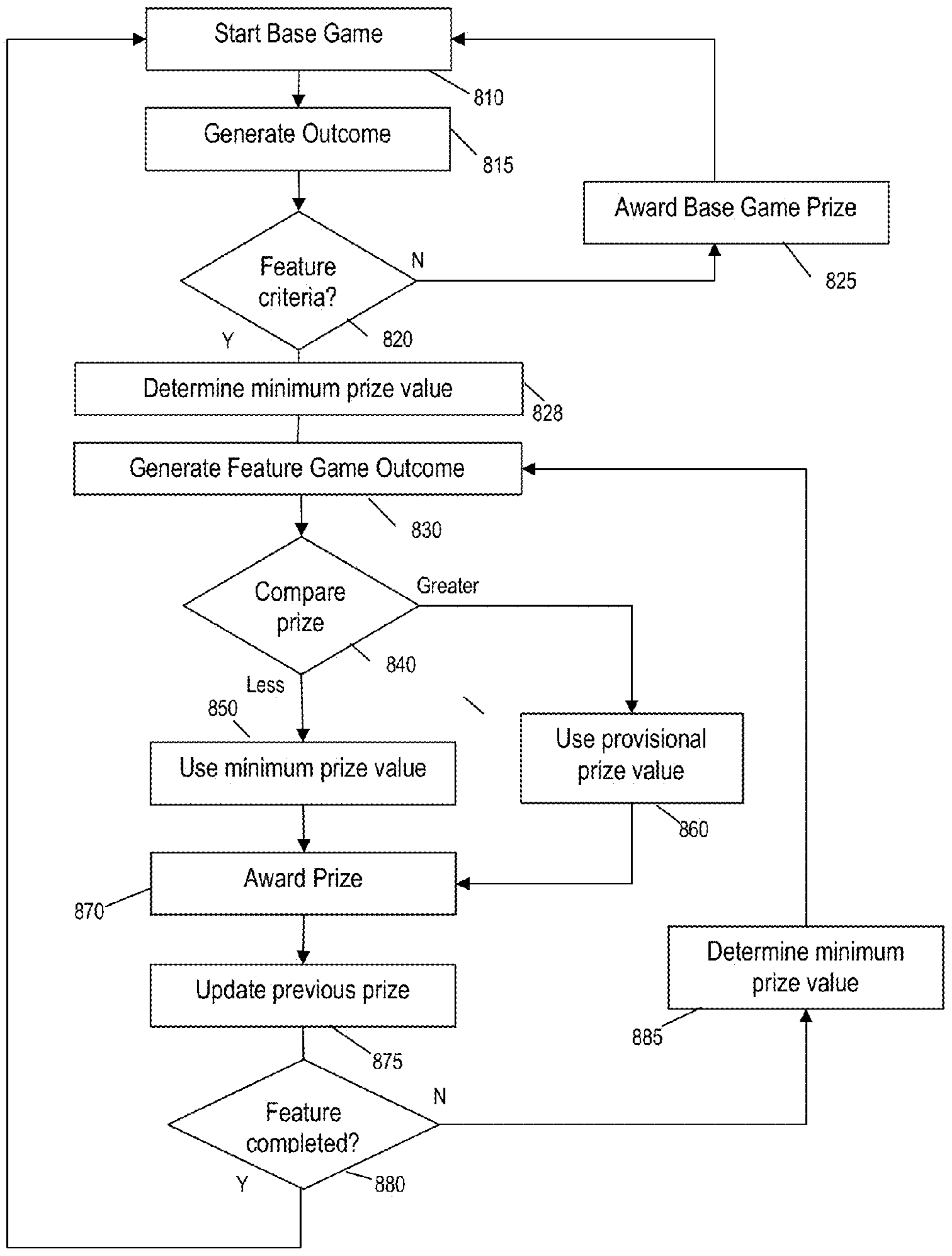
FIG. 8 is a flowchart of an alternative embodiment of a game process.

An example of a game play process where the minimum prize value is applied in a feature game is illustrated in FIG. 8. The player places a bet to start the play of a base game 810 and an outcome is generated for the base game 815. If the eligibility criteria 820 for a feature game are not met then any prize for the base game will be awarded 825 and the game process readies for the play of the next base game. If the game outcome fulfils the eligibility criteria 820 to play a feature game, then the game play process continues on to generate outcomes for one or more feature games where a minimum prize value is determined and applied for the feature game outcome. The number of feature game outcomes may be preset or based on an outcome of the base game. The mathematical function selected for determining a minimum prize value for each outcome may also be preset or based on base game outcomes.

A minimum prize value is determined 828 for the first feature game as described above. A feature game outcome is then generated 830 and displayed to the player. A provisional prize value for the game outcome is also determined and can be displayed to the player along with the game outcome. The provisional prize value may be a prize value determined for the currently generated game outcome only or may be a cumulative prize value based on a prize value for a current game outcome added to a cumulative prize total of prizes to be awarded for previous game outcomes, for example a cumulative prize total stored in a win meter for the feature game. The provisional prize value is compared with the minimum prize value 840. If the provisional prize value is less than the minimum prize value, then the prize is set to the minimum prize value 850. If the provisional prize value is greater than the minimum prize value then the prize to be awarded is set to the provisional prize value 860. The prize for the feature game outcome is awarded 870 and the previous prize value updated 875 based on the prize awarded.

The end criteria for the feature are checked 880 to determine whether the feature game is completed, for example if a predetermined number of feature game outcomes have been generated, an end symbol occurred in the feature game outcome or the like. If the feature game is not completed then the game play process continues with a new minimum prize value determined 885 based on the previous prize value and a further feature game outcome 830 is generated and the new minimum value applied etc until the end criteria are met. Once the end criteria are met the feature game is completed and the game play process returns to the start for the next base game 810.

It should be appreciated by a person skilled in the art that generating game outcome is used herein to refer to a process which can give rise to a win entitlement for a player. For example in a spinning reel embodiment, generating a game outcome may involve spinning all reels to cause a set of symbols to be displayed to the player for win entitlement to be determined based on combinations of symbols appearing the in the displayed symbol set. Generating a game outcome may also involve changing only part of a symbol set, for example by spinning one reel while others are held, holding some selected symbols while reels are spun behind the held symbols or nudging a reel, to generate a new symbol set for which win entitlement can be determined. Similarly, for other styles of games generating a game outcome can occur by modifying part of a previous game outcome to generate a new game outcome for win entitlement assessment to determine a prize to be awarded for the game outcome. For example, in a card game dealing a new card to add to a hand or in a dice game re-rolling one of a plurality of dice may constitute generating a new game outcome. Game rules can define what actions constitute generating a new game outcome, and it will be appreciated by a person skilled in the art that what constitutes generating a new game outcome can vary for different game embodiments.

Modifications to the exemplary game process are envisaged within the scope of various embodiments. For example, a feature game outcome may award generation of further feature game outcomes or a plurality of base games may be played before a feature game is started. A minimum prize value may be determined using a different mathematical function to determine the minimum prize value for each feature game. The feature game may be a different game from a base game, for example a base game may be a spinning reel game and the feature game a dice game. These and any other modifications are contemplated within the scope of the present invention. Feature games may be "free play" games or have a different betting structure to base games. Feature games may be similar to a base game but introduce different features such as additional symbols or prize patterns. Alternatively prize values for feature game outcomes may differ from those of a base game.

An outcome of one or more base games, as well as fulfilling eligibility criteria for a feature game may also be used to determine the mathematical functions used to determine minimum prize values for one or more feature games. For example, a series of base games may be played before a feature game can be played. For each of these base games, if a specified outcome occurs this causes a mathematical function to be made available for selection for determining a minimum prize value during a feature game. For example, each time a combination of three dogs appears in a game outcome the number of times a predetermined mathematical function, say a two times multiplier, can be added to a set of mathematical functions used to determine a minimum prize values for a feature game. The size of the set of mathematical functions can be used to determine the number of game outcomes generated for a feature game, with one of the mathematical functions used to determine the minimum prize value for each game outcome until each has been used once. The size of such a set of mathematical functions or the mathematical functions eligible for adding to the set may be fixed, defined in game rules or based on the amount of an ante bet.

In an alternative example, for a spinning reel game, each time a combination of three cats appears in a win line of the game a two times multiplier may be added to the player's set of minimum prize value determining functions. Each time a combination of four cats appears on a win line a three times multiplier is added to the set of minimum prize value determining functions. These multipliers may be selectively applied during the play of one or more feature games. Selecting which mathematical function to apply to determine a minimum prize value may be based on a predetermined order, such as the order in which the player won the minimum prize determination functions or applying the function in a highest multiplier to lowest multiplier order. Alternatively selecting which minimum prize determination function to apply can be done using pseudo-random number generation performed by a game controller processor. If a set of minimum prize value determining functions are not all applied for a sequence of feature game outcomes, any unused minimum prize value determining functions may be lost or carried over for use in current feature games, dependent on the game rules of the particular game.

In the embodiments described above, a new minimum prize value is determined for each game outcome in a series. In an alternative embodiment a minimum prize value may be compared with a provisional prize value based on the outcome of two or more games, for example the provisional prize value may be selected as the best outcome out of a series of three game outcomes, alternatively the provisional prize outcome may be a cumulative total of prize values for a series of four game outcomes. The number of game outcomes in a series may be predetermined or selected based on game rules. It should be appreciated that it will be generally desirable for a player to have a provisional prize value for a game outcome (or series of outcomes) greater than the determined minimum prize value for the game outcome as this will increase the minimum prize value, and hence prize award guarantee, for current game outcomes.

Some exemplary embodiments of gaming methods, controllers and systems applying a minimum prize value based on a previous game outcome have been described herein. A person skilled in the art should readily appreciate that the minimum prize value may be applied in many alternative embodiments. Any modifications or alterations to the minimum prize value described herein are envisaged within the scope of the present application including that features of the embodiments and examples may be used to form further embodiments.

In the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

It is to be understood that, if any prior art is referred to herein, such reference does not constitute an admission that the publication forms a part of the common general knowledge in the art, in any country.

EXAMPLE 1

In the following non limiting example a player is playing a spinning reel game. According to game rules the previous prize value used to determine the minimum prize value is the player's cumulative total prize value for the feature game. The minimum prize value determination function in this example is defined by the game rules as a two times multiplier. The minimum prize value is applied for of a series of three feature games.

In this example, game rules define provisional prize values as the sum of a prize value for an outcome and the previously awarded prize value.

A player triggers a series of three feature games from a base game. During the feature games the play of the game is free.

The initial minimum prize value is determined to be zero as the player has a cumulative total of zero credits for the feature game before the first reel spin of the feature game.

A game outcome generated for the first free reel spin is illustrated in FIG. 9*a*. The symbols on the reels 910 include a winning combination of five of a kind "Pic5" symbols which pays five hundred credits. The provisional prize value 924 is therefore five hundred credits which is the sum of the prize outcome value 926 and the cumulative total value 928. The provisional prize value is greater than the minimum prize value of zero credits 920, so the player is awarded five hundred credits for the first reel spin.

For the second free spin the minimum prize value 930 is determined by doubling the previous prize value of five hundred credits, thus the minimum prize value 930 is one thousand credits.

The outcome for the second free reel spin is illustrated in FIG. 9*b*. The outcome 912 includes a five of a kind "Pic4" symbols which pays six hundred credits for the game outcome 936. The provisional prize value 934 is eleven hundred credits, which is the sum of the prize total 938 and the game outcome prize value 936. As the provisional prize value is greater than the minimum prize value the prize value to be awarded is set to the provisional prize value, thus the prize total becomes eleven hundred credits.

For the third free spin the minimum prize value 940 is determined by doubling the previous prize value of eleven hundred credits, thus the minimum prize value 940 is twenty two hundred credits.

The outcome for the third free spin is illustrated in FIG. 9*c*. The symbols on the reels 914 include two scatter symbols which pays fifty credits. The provisional prize value 944 is eleven hundred and fifty credits, which is the sum of the prize total 948 of fifty credits and the game outcome prize value 946 of eleven hundred credits. As the minimum prize value is greater than the provisional prize value the prize value to be awarded is set to the minimum prize value. The prize total awarded for the feature game is twenty two hundred credits.

EXAMPLE 2

In the following non limiting example a player is playing a spinning reel game. According to game rules the previous prize value used to determine the minimum prize value is the player's previously awarded prize value for the feature game. The minimum prize value determination function in this example is defined by the game rules as a two times multiplier. The minimum prize value is applied for of a series of three feature games.

In this example, game rules define provisional prize values as the prize value for a generated outcome.

A player triggers a series of three feature games from a base game. During the feature games the play of the game is free.

The initial minimum prize value is determined to be zero as the player has a previous total of zero credits for the feature game before the first reel spin of the feature game.

A game outcome generated for the first free reel spin is illustrated in FIG. 10*a*. The symbols on the reels 1010 include a winning combination of five of a kind "Pic5" symbols which pays five hundred credits. The provisional prize value is therefore five hundred credits. The provisional prize value is greater than the minimum prize value of zero credits 1020, so the player is awarded 500 credits for the first reel spin.

For the second free spin the minimum prize value 1030 is determined by doubling the previously awarded prize value of five hundred credits, thus the minimum prize value 1030 is one thousand credits.

The outcome for the second free reel spin is illustrated in FIG. 10*b*. The outcome 1012 includes a five of a kind "Pic4" symbols which pays six hundred credits, which is the provisional prize value. As the provisional prize value is less than the minimum prize value the prize value to be awarded is set to the minimum prize value of one thousand credits. The prize total becomes fifteen hundred credits.

For the third free spin the minimum prize value 1040 is determined by doubling the previous prize value of one thousand credits, thus the minimum prize value 1040 is two thousand credits.

The outcome for the third free spin is illustrated in FIG. 10*c*. The symbols on the reels 1014 include two scatter symbols which pays a provisional prize value of fifty credits. As the minimum prize value is greater than the provisional prize value, the prize value to be awarded is set to the minimum prize value of two thousand credits. The prize total awarded for the feature game becomes thirty five hundred credits.

EXAMPLE 3

In the following non limiting example a player is playing a spinning reel game. According to game rules the previous prize value used to determine the minimum prize value is the player's cumulative total prize value for the feature game. The minimum prize value determination function in this example is randomly selected by the game controller from a defined set of mathematical functions. The minimum prize value is applied for of a series of three feature games.

In this example, game rules define provisional prize values as the sum of a prize value for an outcome and the previously awarded prize value.

A player triggers a series of three feature games from a base game. During the feature games the play of the game is free.

The initial minimum prize value is determined to be zero as the player has a cumulative total of zero credits for the feature game before the first reel spin of the feature game.

A game outcome generated for the first free reel spin is illustrated in FIG. 11*a*. The symbols on the reels 1110 include a winning combination of five of a kind "Pic5" symbols which pays five hundred credits. The provisional prize value 1124 is therefore five hundred credits which is the sum of the prize outcome value 1126 and the cumulative total value 1128. The provisional prize value is greater than the minimum prize value of zero credits 1120, so the player is awarded five hundred credits for the first reel spin.

For the second free spin the mathematical function selected for determining the minimum prize value 1130 is a two time multiplier, thus the minimum prize value 1130 is determined by doubling the previous prize value of five hundred credits to give a minimum prize value of one thousand credits.

The outcome for the second free reel spin is illustrated in FIG. 11*b*. The outcome 1112 includes a five of a kind "Pic4" symbols which pays six hundred credits for the game outcome 1136. The provisional prize value 1134 is eleven hundred credits, which is the sum of the prize total 1138 and the game outcome prize value 1136. As the provisional prize value is greater than the minimum prize value the prize value to be awarded is set to the provisional prize value, thus the prize total becomes eleven hundred credits.

For the third free spin the mathematical function selected for determining the minimum prize value 1140 is a five hundred credit adder, thus the minimum prize value 1140 is determined by adding five hundred credits to the previous prize value of eleven hundred credits to give a minimum prize value 1140 of sixteen hundred credits.

The outcome for the third free spin is illustrated in FIG. 11*c*. The symbols on the reels 1114 include two scatter symbols which pays fifty credits. The provisional prize value 1144 is eleven hundred and fifty credits, which is the sum of the prize total 1148 of fifty credits and the game outcome prize value 1146 of eleven hundred credits. As the minimum prize value is greater than the provisional prize value the prize value to be awarded is set to the minimum prize value. The prize total awarded for the feature game is sixteen hundred credits.

EXAMPLE 4

In the following non limiting example a player is playing a spinning reel game. According to game rules the previous prize value used to determine the minimum prize value is the player's cumulative prize value for the feature game. The minimum prize value determination function in this example is defined by the game rules as a two times multiplier. The minimum prize value is applied for of a series of three feature games.

In this example, game rules define provisional prize values as the prize value for a generated outcome.

A player triggers a series of three feature games from a base game. During the feature games the play of the game is free.

The initial minimum prize value is determined based on a prize value for a game outcome of the base game which triggered the feature game. In this example the prize value for the game outcome triggering the feature game is three hundred credits. Thus the minimum prize value 1220 for the first reel spin of the feature game is six hundred credits, double the prize value for the base game.

A game outcome generated for the first free reel spin is illustrated in FIG. 12*a*. The symbols on the reels 1210 include a winning combination of five of a kind "Pic5" symbols which pays five hundred credits. The provisional prize value is therefore five hundred credits. The provisional prize value is less than the minimum prize value of six hundred credits 1120, so the player is awarded six hundred credits for the first reel spin.

For the second free spin the minimum prize value 1230 is determined by doubling the previously awarded prize value of six hundred credits, thus the minimum prize value 1230 is twelve hundred credits.

The outcome for the second free reel spin is illustrated in FIG. 12*b*. The outcome 1212 includes a five of a kind "Pic4" symbols which pays six hundred credits, which is the provisional prize value. As the provisional prize value is less than the minimum prize value the prize value to be awarded is set to the minimum prize value of twelve hundred credits. The prize total becomes eighteen hundred credits.

For the third free spin the minimum prize value 1040 is determined by doubling the cumulative prize value of eighteen hundred credits, thus the minimum prize value 1240 is thirty six hundred credits.

The outcome for the third free spin is illustrated in FIG. 12*c*. The symbols on the reels 1214 include two scatter symbols which pays a provisional prize value of fifty credits. As the minimum prize value is greater than the provisional prize value, the prize value to be awarded is set to the minimum prize value of thirty six hundred credits. The prize total awarded for the feature game becomes fifty four hundred credits.

EXAMPLE 5

In the following non limiting example a player is playing a spinning reel game. According to game rules the previous prize value used to determine the minimum prize value is the player's cumulative total prize value for the feature game. The minimum prize value determination function in this example is defined by the game rules as a two times multiplier. The minimum prize value is applied for of a series of three feature games.

In this example, game rules define provisional prize values as the sum of a prize value for an outcome and the previously awarded prize value.

A player triggers a series of four feature games from a base game. During the feature games the play of the game is free.

The initial minimum prize value is determined to be zero as the player has a cumulative total of zero credits for the feature game before the first reel spin of the feature game.

A game outcome generated for the first free reel spin is illustrated in FIG. 13*a*. The symbols on the reels 1310 include no winning combinations. The provisional prize value 1324 is therefore zero credits which is the sum of the prize outcome value 1326 and the cumulative total value 1328. As the minimum prize value is also zero credits 1320, the player is awarded zero credits for the first reel spin.

For the second free spin the minimum prize value 1330 is determined, based on a the previous reel spin outcome having no winning combinations, in accordance with game rule by setting the minimum value to a given value. In this case the minimum prize value 1330 is twenty credits.

The outcome for the second free reel spin is illustrated in FIG. 13*b*. The outcome 1312 includes no wining combinations. The prize value is therefore zero for the game outcome 1336. The provisional prize value 1334 is again zero, which is the sum of the prize total 1338 and the game outcome prize value 1336. As the provisional prize value is less than the minimum prize value the prize value to be awarded is set to the minimum prize value of twenty credits.

For the third free spin the minimum prize value 1340 is determined by doubling the previous prize value of twenty credits, thus the minimum prize value 1340 is forty credits.

The outcome for the third free spin is illustrated in FIG. 13*c*. The symbols on the reels 1314 include two scatter symbols which pays fifty credits. The provisional prize value 1344 is seventy credits, which is the sum of the prize total 1348 of twenty credits and the game outcome prize value 1346 of fifty credits. As the minimum prize value is less than the provisional prize value the prize value to be awarded is set to the provisional prize value.

For the fourth free spin the minimum prize value 1350 is determined by doubling the previous prize value of seventy credits, thus the minimum prize value 1350 is one hundred and forty credits.

The outcome for the fourth free spin is illustrated in FIG. 13*d*. The symbols on the reels 1316 include two scatter symbols which pays fifty credits. The provisional prize value 1354 is one hundred and twenty credits, which is the sum of the prize total 1358 of seventy credits and the game outcome prize value 1356 of fifty credits. As the minimum prize value is greater than the provisional prize value the prize value to be awarded is set to the minimum prize value. The prize total awarded for the feature game is one hundred and forty credits.

The invention claimed is:

1. A method of gaming for use with a gaming machine having a game controller, the method comprising:

(a) determining via the game controller a minimum prize value to be awarded for a current game outcome, the minimum prize value being determined based on a previous prize value awarded for a previous game outcome;

(b) generating via the game controller the current game outcome;

(c) determining via the game controller a provisional prize value based on the current game outcome and the previous game outcome;

(d) comparing via the game controller the provisional prize value with the minimum prize value; and (e) awarding via the game controller for the current game outcome a current prize value of the minimum prize value in response to the provisional prize value being less than the minimum prize value; and awarding for the current game outcome a current prize value of the provisional prize value in response to the provisional prize value being greater than or equal to the minimum prize value.

2. A method, as claimed in claim 1, wherein said determining a minimum prize value includes multiplying the previous prize value by a given multiplier.

3. A method, as claimed in claim 2, wherein said determining a minimum prize value includes predetermining the multiplier.

4. A method, as claimed in claim 2, wherein said determining a minimum prize value includes determining the multiplier during game play based on at least one game rule.

5. A method, as claimed in claim 2, wherein said determining a minimum prize value includes determining the multiplier based on player action.

6. A method, as claimed in claim 1, and further comprising:

updating the previous prize value based on the current prize value; and repeating steps (a) to (e) to generate a subsequent prize value with the updated previous prize value.

7. A method, as claimed in claim 1, wherein said determining a provisional prize value includes determining a current game outcome prize value; and adding the current game outcome prize value to the previous prize value.

8. A method, as claimed in claim 1, and further comprising performing steps (a) to (e) in a feature game.

9. A method, as claimed in claim 8, and further comprising providing access to the feature game on fulfillment of eligibility criteria.

10. A method, as claimed in claim 9, and further comprising basing the eligibility criteria on at least one of a game outcome and player activity.

11. A method, as claimed in claim 1, and further comprising generating an initial game outcome, determining an initial prize value and determining an initial minimum prize value from the initial prize value.

12. A method, as claimed in claim 1, and further comprising repeating steps (a) to (e) until an end condition is met; and awarding the current prize value when the end condition is met.

13. A method, as claimed in claim 12, and further comprising generating the end condition by counting a given number of repetitions.

14. A method, as claimed in claim 12, and further comprising generating the end condition in response to a given game outcome occurring.

15. A game controller for a gaming system, the game controller arranged to:

determine a minimum prize value to be awarded for a current game outcome, the minimum prize value being determined based on a previous prize value awarded for a previous game outcome;

generate the current game outcome;

determine a provisional prize value based on the current game outcome and the previous game outcome;

compare the provisional prize value with the minimum prize value; and award for the current game outcome a current prize value of the minimum prize value in response to the provisional prize value being less than the minimum prize value; and award for the current game outcome a current prize value of the provisional prize value in response to the provisional prize value being greater than or equal to the minimum prize value.

16. A game controller, as claimed in claim 15, wherein the game controller is arranged to determine the minimum prize value by multiplying the previous prize value by a given multiplier.

17. A game controller, as claimed in claim 16, wherein the multiplier is predetermined.

18. A game controller, as claimed in claim 16, wherein the game controller is arranged to determine the multiplier during game play based on at least one game rule.

19. A game controller, as claimed in claim 16, wherein the game controller is arranged to determine the multiplier based on player action.

20. A game controller, as claimed in claim 15, wherein the game controller is further arranged to update the previous prize value based on the current prize value and conduct a subsequent iteration with the updated previous value to determine a new current prize value.

21. A game controller, as claimed in claim 15, wherein the game controller is arranged to determine the provisional prize value by determining a current game outcome prize value and adding the current game outcome prize value to the previous prize value.

22. A game controller, as claimed in claim 15, wherein the game controller is arranged to generate an initial game outcome, determine an initial prize value and determine an initial minimum prize value from the initial prize value.

23. A game controller, as claimed in claim 15, wherein the game controller is arranged to repeatedly generate game outcomes until an end condition is met and to award the current prize value when the end condition is met.

24. A game system comprising:

a player interface for entering game play instructions by a player and providing game outcome and prize information to the player;

a game outcome generator adapted to generate a game outcome for a player based on a random result and determine a provisional prize value based on any winning criteria occurring in the game outcome and a previous game outcome; and a prize manager adapted to (1) determine a minimum prize value for a current game outcome, the minimum prize value being determined based on the previous prize value awarded for a previous game outcome, (2) compare the provisional prize value with the minimum prize value, and (3) award for the current game outcome a current prize value of the minimum prize value in response to the provisional prize value being less than the minimum prize value, and award for the current game outcome a current prize value of the provisional prize value in response to the provisional prize value being greater than or equal to the minimum prize value.

25. A game system as claimed in claim 24, and wherein the prize manager is further adapted to multiply the previous prize value by a given multiplier to determine the minimum prize value.

26. A game system as claimed in claim 24, and wherein the prize manager is further arranged to update the previous prize value based on the current prize value; and wherein the game outcome generator and the prize manager of the gaming system conduct a subsequent iteration with the updated previous value to determine a new current prize value.

27. A game system, as claimed in claim 24, and wherein the game outcome generator is arranged to determine the provisional prize value by determining a current game outcome prize value and to add the current game outcome prize value to the previous prize value.

28. A game system, as claimed in claim 24, and wherein the game outcome generator is further arranged to generate an initial game outcome, determine an initial prize value and determine an initial minimum prize value from the initial prize value.

29. A game system, as claimed in claim 24, and wherein the game outcome generator is further arranged to repeatedly generate game outcomes until an end condition is met and to award the current prize value when the end condition is met.

30. A gaming system comprising:

a cabinet;

a display mounted to the cabinet for displaying game outcomes to a player;

at least one input device mounted to the cabinet and operable by a player to initiate plays of a game; and a game controller disposed within the cabinet, the game controller comprising a memory storing program code and a processor in data communication with the display, the input device and the memory; and said processor arranged to execute at least part of the program code in response to initiation of a play of the game to implement a game, the game controller being arranged to determine a minimum prize value to be awarded for a current game outcome, the minimum prize value being determined based on a previous prize value awarded for a previous game outcome, to generate the current game outcome, to determine a provisional prize value based on the current game outcome and the previous game outcome, to compare the provisional prize value with the minimum prize value, and to award to a player of the current game the minimum prize value in response to the provisional prize value being less than the minimum prize value, and to award to the player the provisional prize value in response to the provisional prize value being greater than or equal to the minimum prize value.

* * * * *

UNITED STATES PATENT AND TRADEMARK OFFICE

CERTIFICATE OF CORRECTION

PATENT NO. : 8,616,960 B2
APPLICATION NO. : 12/491753
DATED : December 31, 2013
INVENTOR(S) : Kevin Francis Prendergast et al.

It is certified that error appears in the above-identified patent and that said Letters Patent is hereby corrected as shown below:

Title page of the patent under item (73) Assignee please delete “Austrailia” and insert --Australia--

Signed and Sealed this
Thirteenth Day of January, 2015

Michelle K. Lee
*Deputy Director of the United States Patent and Trademark Office*